(12) United States Patent
Park et al.

(10) Patent No.: US 11,505,091 B2
(45) Date of Patent: Nov. 22, 2022

(54) SEAT RECLINING DEVICE

(71) Applicants: Hyundai Motor Company, Seoul (KR); Kia Motors Corporation, Seoul (KR); Hyundai Transys Inc., Seosan-si (KR); Daechang Seat Co., Ltd-Dongtan, Hwaseong-si (KR)

(72) Inventors: Sang Hoon Park, Incheon (KR); Tae Hoon Lee, Suwon-si (KR); Byeong Seon Son, Seoul (KR); Sang Ho Kim, Incheon (KR); Ji Hwan Kim, Seoul (KR); Seon Chae Na, Yongin-si (KR); Jeon Jin Lim, Hwaseong-si (KR); Kwang Hun Choi, Ansans-si (KR)

(73) Assignees: Hyundai Motor Company, Seoul (KR); Kia Motors Corporation, Seoul (KR); Hyundai Transys Inc., Seasan-si (KR); Daechang Seat Co., Ltd-Dongtan, Gyeonggi-do (KR)

( * ) Notice: Subject to any disclaimer, the term of this patent is extended or adjusted under 35 U.S.C. 154(b) by 53 days.

(21) Appl. No.: 17/153,577

(22) Filed: Jan. 20, 2021

(65) Prior Publication Data
US 2022/0032819 A1 Feb. 3, 2022

(30) Foreign Application Priority Data
Jul. 28, 2020 (KR) .................. 10-2020-0093867

(51) Int. Cl.
*B60N 2/22* (2006.01)
*B60N 2/02* (2006.01)
(Continued)

(52) U.S. Cl.
CPC ............ *B60N 2/0232* (2013.01); *B60N 2/07* (2013.01); *B60N 2/20* (2013.01); *B60N 2/2209* (2013.01);
(Continued)

(58) Field of Classification Search
CPC ................ B60N 2/2222; B60N 2/2209; B60N 2/2245; B60N 2/0232
See application file for complete search history.

(56) References Cited

U.S. PATENT DOCUMENTS 7,845,729 B2 * 12/2010 Yamada ............... B60N 2/0232
297/354.11
9,539,920 B2 * 1/2017 Müller ................. B60N 2/2245

FOREIGN PATENT DOCUMENTS

KR 10-1326505 B1 11/2013

* cited by examiner

*Primary Examiner* — Syed A Islam
(74) *Attorney, Agent, or Firm* — Morgan, Lewis & Bockius LLP (57) ABSTRACT

In a seat reclining device, a seatback frame forming a skeleton of a seatback is coupled to a seat cushion frame to be rotatable about a shaft with respect to the seat cushion frame. One end portion of a first sliding bracket is rotatably coupled to a middle portion of the seatback frame by a driving unit. The other end portion of the first sliding bracket extends toward a vehicle body located behind the seatback. A second sliding bracket is mounted on the vehicle body located behind the seatback and extends toward the first sliding bracket in a front and rear longitudinal direction to be connected to the first sliding bracket. The second sliding bracket is configured to guide a sliding movement of the first sliding bracket while the first sliding bracket is being rotated.

10 Claims, 6 Drawing Sheets

(51) Int. Cl.
*B60N 2/20* (2006.01)
*B60N 2/07* (2006.01)
(52) U.S. Cl.
CPC .......... *B60N 2/2222* (2013.01); *B60N 2/2245* (2013.01); *B60N 2002/0236* (2013.01)

SEAT RECLINING DEVICE

CROSS REFERENCE TO RELATED APPLICATION

The present application claims priority to Korean Patent Application No. 10-2020-0093867, filed Jul. 28, 2020, the entire contents of which is incorporated herein for all purposes by this reference.

BACKGROUND OF THE INVENTION

Field of the Invention

The present invention relates to a seat reclining apparatus facilitating the angle of a seat back of a rear seat to be adjusted without the movement of a seat cushion, improving the convenience of a passenger.

Description of Related Art

In a luxury car, when a passenger accommodated in a rear seat adjusts the angle of the seatback into a relax position to take a rest or a nap, the seatback is reclined, and a seat cushion is moved forward, due to the seatback being connected to the seat cushion via a hinge structure.

Responsively, the lower body of the passenger is moved forward, causing the leg room in front of the passenger to be insufficient. Furthermore, the buttocks of the passenger are pushed forward, causing the supporting ability of the bottom portion of the seatback to be reduced. Consequently, the ability of the seatback to comfortably support the passenger is reduced, which is problematic.

Furthermore, the passenger may desire to only set the seatback to be upright while maintaining the seat cushion fixed to read a book or watch a monitor in a relaxed position, but there has been no function able to realize such a desire, causing the passenger to be uncomfortable.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a seat reclining apparatus facilitating the angle of a seat back of a rear seat to be adjusted without the movement of a seat cushion, improving the convenience of a passenger.

In various aspects of the present invention, a seat reclining apparatus may include: a seatback frame forming a skeleton of a seatback, and coupled to a seat cushion frame to be rotatable about the seat cushion frame; a first sliding bracket, with one end portion thereof being rotatably coupled to a middle portion of the seatback frame by a driving unit, and the other end portion thereof extending toward a vehicle body located behind the seatback; a second sliding bracket mounted on the vehicle body located behind the seatback and extending toward the first sliding bracket in a front and rear longitudinal direction to be connected to the first sliding bracket, wherein the second sliding bracket is configured to guide a sliding movement of the first sliding bracket while the first sliding bracket is being rotated.

A guide roller may be coupled to a rear end portion of the first sliding bracket. A slot may be provided in a longitudinal direction of the second sliding bracket such that the guide roller slides along the slot.

A hinge shaft may be fixed to a front end portion of the first sliding bracket, and is rotatably coupled to the middle portion of the seatback frame.

The driving unit may be a motor. The motor and the hinge shaft may be connected using a gear engagement structure such that the first sliding bracket is rotated by a rotational force of the motor.

A driving gear may be coupled to a shaft of the motor. A driven gear may be coupled to one end portion of the hinge shaft to be gear-engaged with the driving gear. A stopping hole may be provided along a path of rotation of the driven gear. A stopper pin may be inserted into the stopping hole to control a rotation angle of the driven gear.

The driving gear may be a pinion gear, and the driven gear may be a fan-shaped sector gear.

A mounting bracket may be fixed to a rear end portion of the second sliding bracket and be mounted on the vehicle body.

The seatback frame may include: a sub-frame to which the first sliding bracket is pivotally coupled, with a seatback hinge bracket being fixed to a bottom end portion of the sub-frame; and a main frame provided in front of the sub-frame, with a bottom portion thereof being fitted to a mounting hole formed in a bottom end portion of the seatback hinge bracket. A cushion hinge bracket fixed to a rear end portion of the seat cushion frame may be axially coupled to a side surface of the seatback hinge bracket using a hinge structure.

A seatback fixing portion integrally may extend upwards from a top end portion of the sub-frame to which the first sliding bracket is pivotally coupled.

A V-shaped coupling hole may be provided in a top end portion of the seatback fixing portion such that the seatback is coupled to the seatback fixing portion through the V-shaped coupling hole.

As described above, in the case of a rear seat of a car, only the angle of the seatback may be adjusted, with the position of the seat cushion being fixed, to increase the space of the leg room in front of the rear seat passenger in the seat relax mode, improving the comfort of the rear seat passenger.

Furthermore, the degree by which the angle of the seatback is adjusted may be increased to increase the degree of freedom of the relaxing position of the passenger, and the supporting ability of the bottom portion of the seatback may be increased to improve the comfort of the passenger.

Furthermore, the first sliding bracket and the hinge shaft may be integrated, and the second sliding bracket and the mounting bracket may be integrated, so that the number of components may be reduced to reduce costs for materials and the weight of the product. Furthermore, the seat cushion frame is coupled to the seatback frame by coupling the cushion hinge brackets to the side surfaces of the seatback hinge brackets, by which the sub-frame and the main frame are coupled, using the hinge structures. Accordingly, the installation structure of the brackets, by which the seatback frame and the seat cushion frame are coupled, may be optimized, simplifying the coupling structure between components and reducing costs for materials and the weight of the product.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings.

Figure 1:
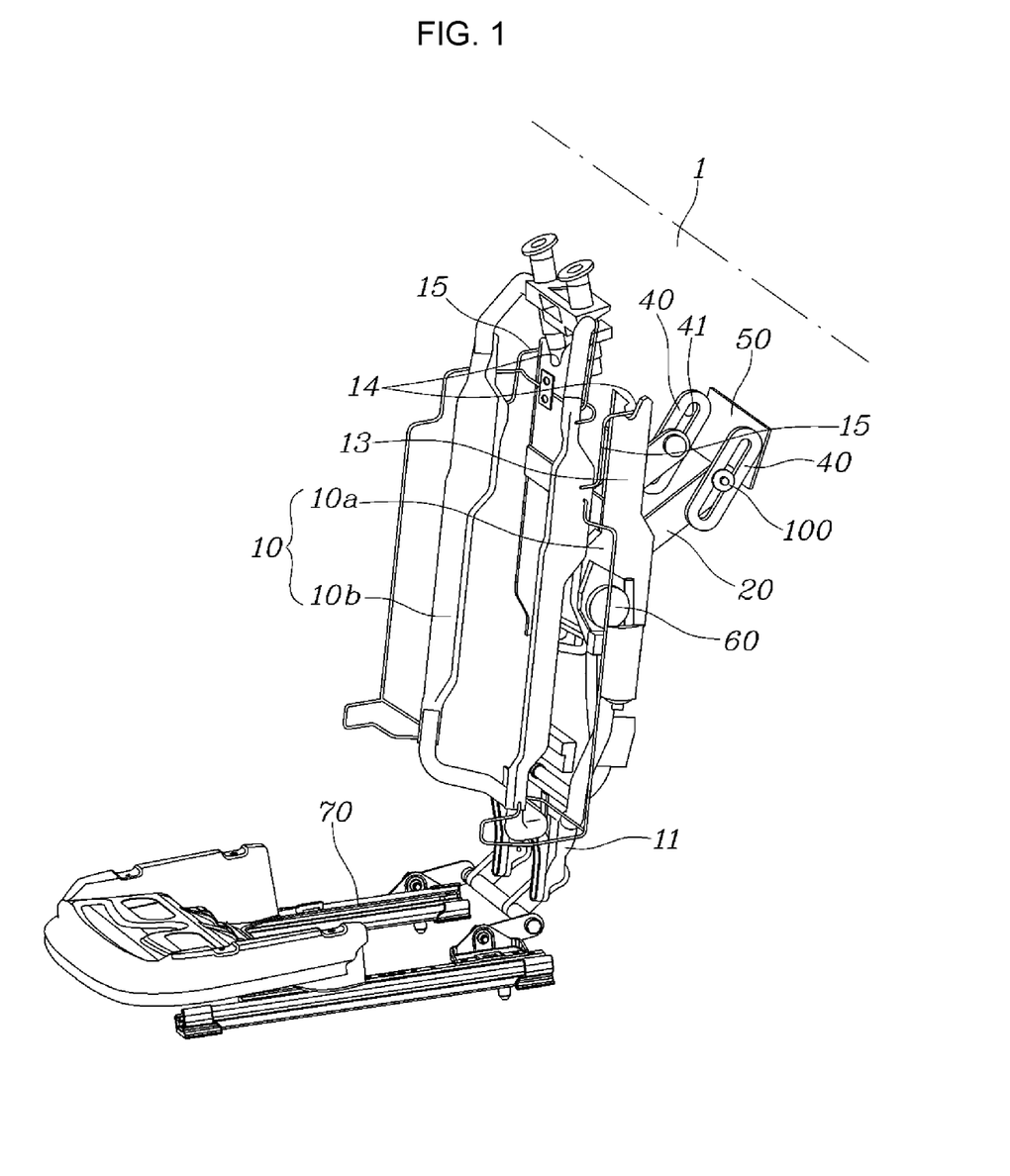
FIG. 1 is a perspective view exemplarily illustrating the structure of a rear seat reclining apparatus according to various exemplary embodiments of the present invention.
Figure 2:
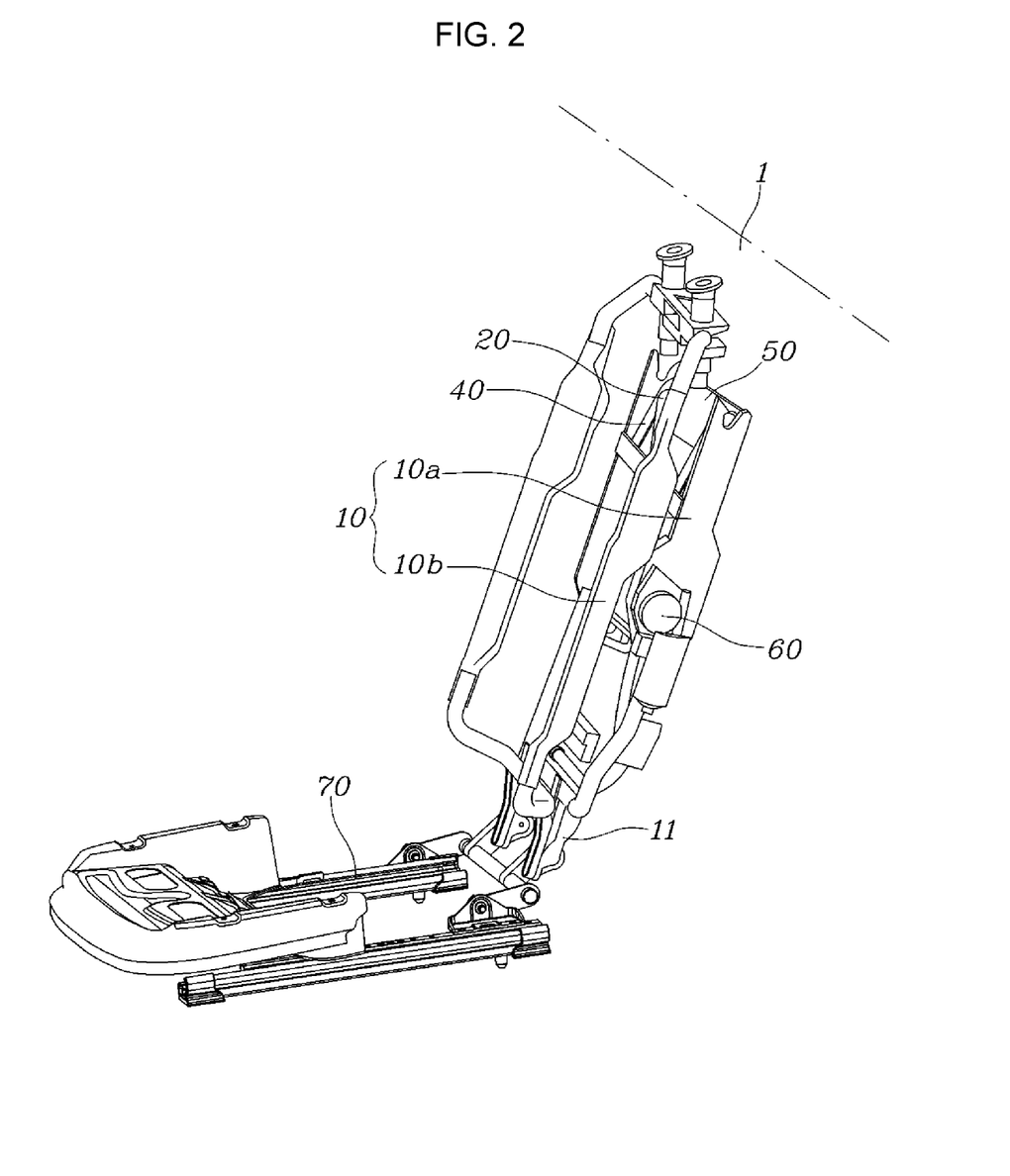
FIG. 2 illustrates a state in which the seat back illustrated in FIG. 1 is reclined.

FIG. 1 is a perspective view exemplarily illustrating the structure of a rear seat reclining apparatus according to various exemplary embodiments of the present invention, and FIG. 2 illustrates a state in which a seatback frame 10 illustrated in FIG. 1 is reclined.

Described with reference to the drawings, the rear seat reclining apparatus includes a seatback frame 10, a first sliding bracket 20, and a second sliding bracket 40. The seatback frame 10 forms the skeleton of a seatback 2, and is coupled to a seat cushion frame 70 to be rotatable about a shaft with respect to the seat cushion frame 70. One end portion of the first sliding bracket 20 is rotatably coupled to a middle portion of the seatback frame 10 such that the first sliding bracket 20 is rotated about an axis extending through the right and left portions of the seatback frame 10 by a driving unit, while the other end portion of the sliding bracket 20 extends toward the vehicle body 1 located behind the seatback 2. The second sliding bracket 40 is mounted on the vehicle body 1 located behind the seatback 2 and extends toward the first sliding bracket 20 in a front and rear longitudinal direction to be connected to the first sliding bracket 20. The second sliding bracket 40 guides a sliding movement of the first sliding bracket 20 while the first sliding bracket 20 is being rotated.

The seatback frame 10 forms the skeleton outside the seatback frame 10, and has the shape of a substantially rectangular frame. A headrest support (designated with no reference numeral) on which a headrest is mounted may be mounted on the top portion top end portion of the seatback frame 10.

Furthermore, the bottom end portion of the seatback frame 10 is coupled to the rear end portion of the seat cushion frame 70 using hinge structures 72, by which the angle of the seatback frame 10 may be adjusted in forward and backward directions.

Furthermore, the front end portion of the first sliding bracket 20 is rotated about the middle portion of the seatback frame 10 so that the rear end portion of the first sliding bracket 20 is rotated in the top-bottom direction thereof. The first sliding bracket 20 has an elongated shape inclined upwardly in a direction from the front end portion to the rear end portion.

Furthermore, the second sliding bracket 40 is inclined upwardly in a direction from the rear end portion to the front end portion, with the rear end portion thereof being fixed to the partition panel located behind the seatback 2. Thus, the first sliding bracket 20 may be guided and moved in the longitudinal direction of the second sliding bracket 40 in a state in which the first sliding bracket 20 is connected to the second sliding bracket 40.

According to the above-described structure, the downwardly inclined angle of the second sliding bracket 40 is fixed, and the first sliding bracket 20 is rotated by rotational force applied thereto from the driving unit, so that the first sliding bracket 20 is guided along the second sliding bracket 40, with the upwardly inclined angle thereof gradually changing according to an angle at which the first sliding bracket 20 is rotated.

That is, in a state in which the seatback 2 is upright, when forward rotational force is applied by the driving unit, the rear end portion of the first sliding bracket 20 is moved upwards along with the second sliding bracket 40 while being rotated upwards about the front end portion of the first sliding bracket 20.

Thus, the seatback frame 10 is rotated about the hinge structures 72 on the bottom end portion in a direction in which the seatback frame 10 is reclined, so that only the angle of the seatback 2 may be adjusted to a relax position after the position of the seat cushion is fixed as illustrated in FIG. 2.

Furthermore, in various exemplary embodiments of the present invention, the first sliding bracket 20 may have a guide movement structure for the second slide bracket 40. The guide movement structure may be configured such that a roller moves along a slot.

Referring to FIG. 1 and FIG. 2, a guide roller 21 is rotatably coupled to the rear end portion of the first sliding bracket 20.

Furthermore, the second sliding bracket 40 has a slot 41 in the shape of a long hole extending in the longitudinal direction thereof, and the guide roller 21 is inserted into the slot 41. In the present structure, the guide roller 21 may slide along the slot 41.

That is, in a state in which the seatback 2 is upright, when rotational force is applied to the first sliding bracket 20, the guide roller 21 is guided and moved in an upward direction from the front end portion to the rear end portion of the slot 41, so that the seatback frame 10 is rotated backwards. Consequently, the angle of the seatback 2 may be adjusted so that the seatback 2 is laid.

For reference, in various exemplary embodiments of the present invention, only a structure in which the first sliding bracket 20 is provided with the guide roller 21 and the second sliding bracket 40 is provided with the slot 41 is illustrated. However, as various exemplary embodiments of the present invention, a structure in which the slot 41 is formed in the longitudinal direction of the first sliding bracket 20 and the guide roller is coupled to the front end portion of the second sliding bracket 40 may be provided.

Furthermore, referring to FIG. 1, in various exemplary embodiments of the present invention, a hinge shaft 30 may be fixed to the front end portion of the first sliding bracket 20 by a fixing method, such as welding, and both end portions of the hinge shaft 30 may be rotatably coupled to opposite portions (or both portions) of the middle portion of the seatback frame 10.

That is, when the hinge shaft 30 is rotated by the rotational force of the driving unit, the first sliding bracket 20 fixed to the hinge shaft 30 may be rotated along with the hinge shaft 30.

Figure 3:
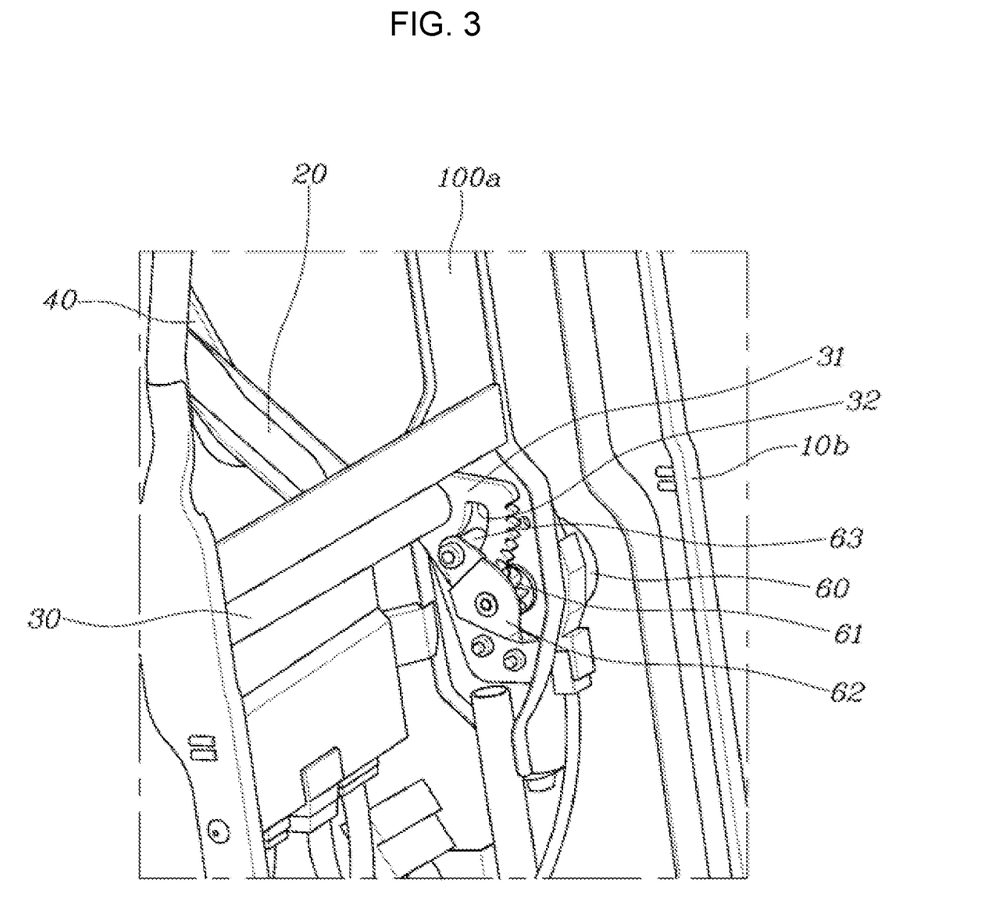
FIG. 3 and FIG. 4 illustrate a coupling relationship between the motor and the hinge shaft of the seat reclining apparatus according to various exemplary embodiments of the present invention.
Figure 4:
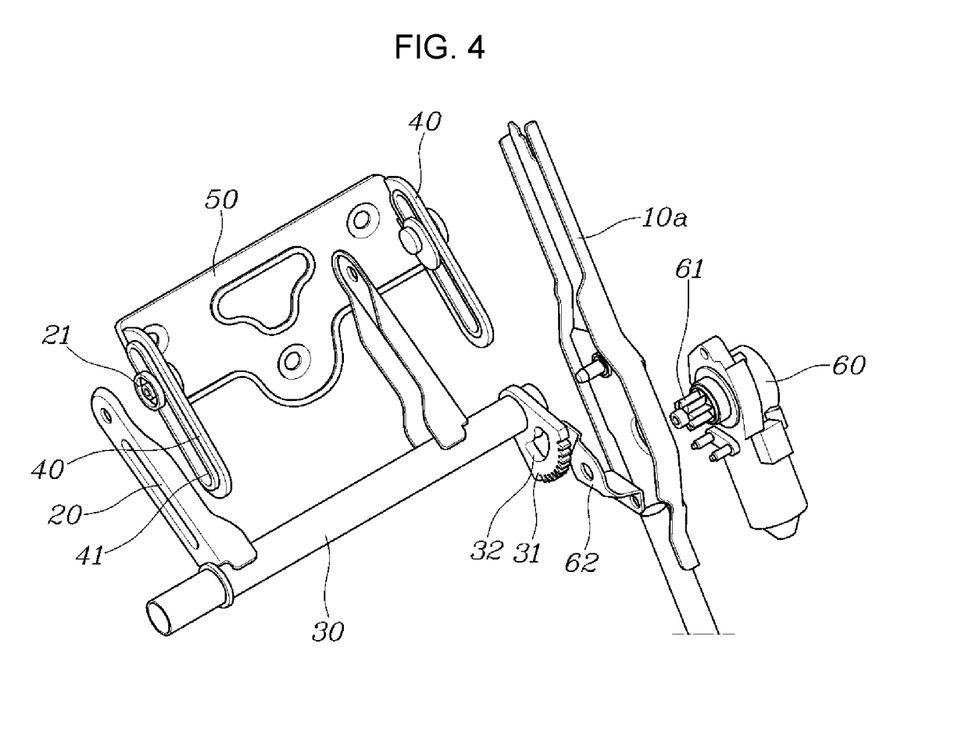

FIG. 3 and FIG. 4 illustrate a coupling relationship between a motor 60 and the hinge shaft 30 of the seat reclining apparatus according to various exemplary embodiments of the present invention. Referring to FIG. 3 and FIG. 4, the driving unit is the motor 60 providing driving force for a reclining operation. The motor 60 may be mounted on a portion of the seatback frame 10, and may be rotated in forward and backward directions in a response to a reclining operation switch being operated.

Furthermore, the motor 60 and the hinge shaft 30 are connected by a gear engagement structure such that the first sliding bracket 20 is rotated by the rotational force of the motor 60.

The shaft of the motor 60 extends through side surfaces of the seatback frame 10, and a driving gear 61 is coupled to the shaft of the motor 60.

Furthermore, a driven gear 31 is fixedly coupled to one end portion of the hinge shaft 30, being gear-engaged with the driving gear 61. Alternatively, driven gears 31 may be fixedly coupled to both end portions of the hinge shaft 30. Here, the driving gear 61 may be a pinion gear, while the driven gear 31 may be a fan-shaped sector gear.

An arc-shaped stopping hole 32 is provided within the turning radius of the driven gear 31, along a path of rotation of the driven gear 31.

Furthermore, a stopper pin 63 is inserted into the stopping hole 32 to control the rotation angle of the driven gear 31.

For example, the bottom end portion of a support bracket 62 is coupled to the internal surface of the seatback frame 10, and the rotation shaft of the motor 60 is rotatably fitted to a middle portion of the support bracket 62. Furthermore, a stopper pin 63 is coupled to the top portion top end portion of the support bracket 62 in a direction toward the stopping hole 32 such that the stopper pin 63 is fitted into the stopping hole 32.

That is, when the driving gear 61 is rotated by the driving of the motor 60, the driven gear 31 gear-engaged with the driving gear 61 is rotated, rotating the hinge shaft 30. When the stopper pin 63 is caught by the internal terminal end portion of the stopping hole 32 during the rotation of the driven gear 31, the rotation of the driven gear 31 is limited, preventing the seatback 2 from being excessively reclined.

Furthermore, referring to FIG. 1 and FIG. 2, in various exemplary embodiments of the present invention, a mounting bracket 50 supporting the top portion top end portion of the seatback frame 10 is fixed to the rear end portion of the second sliding bracket 40. The mounting bracket 50 is mounted on a portion of the vehicle body 1 supporting the rear seatback 2 from behind, i.e., the front surface of a partition panel.

Figure 5:
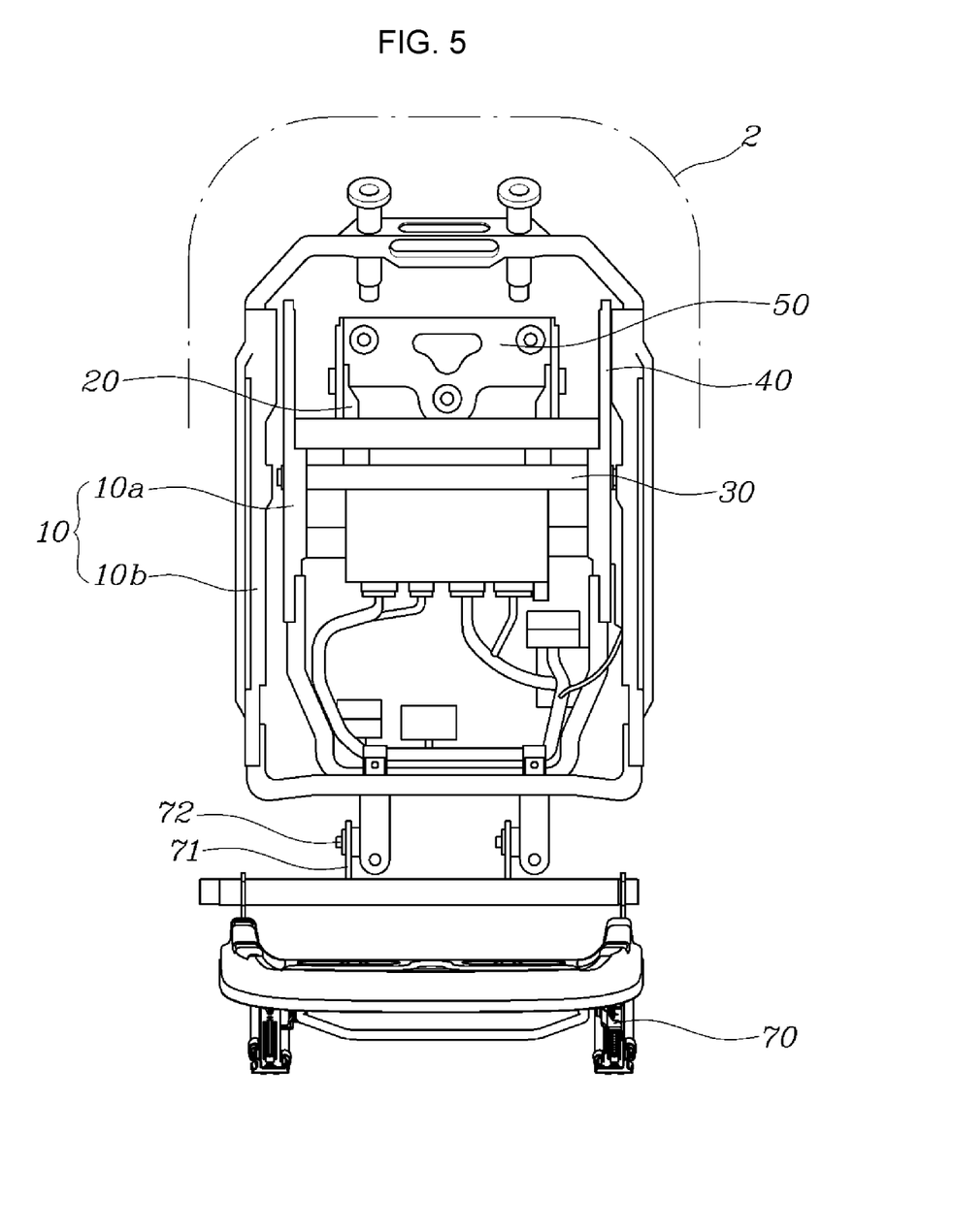
FIG. 5 is a front view exemplarily illustrating the internal structure of a rear seat according to various exemplary embodiments of the present invention.
Figure 6:
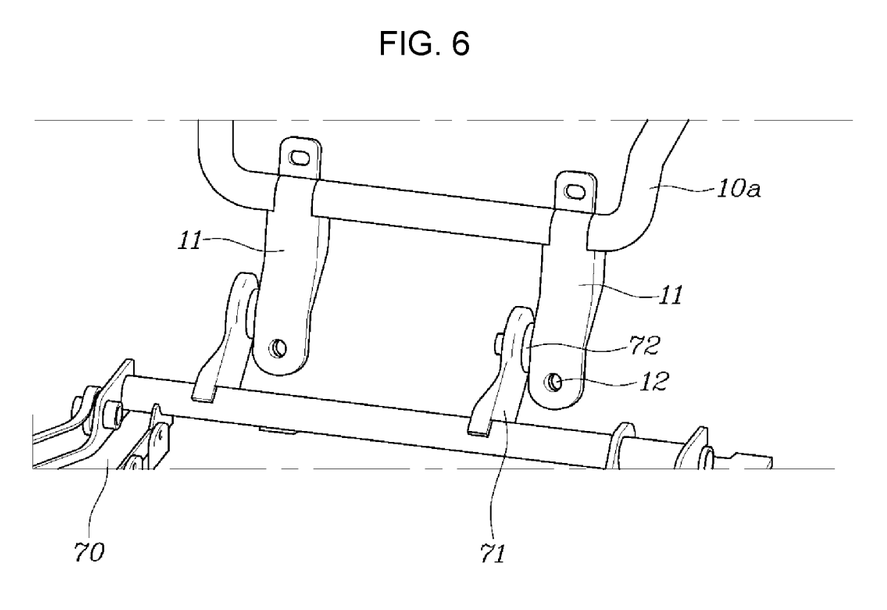
FIG. 6 illustrates a coupling relationship between the seatback frame and the seat cushion frame according to various exemplary embodiments of the present invention.

FIG. 5 is a front view exemplarily illustrating the internal structure of a rear seat according to various exemplary embodiments of the present invention, and FIG. 6 illustrates a coupling relationship between the seatback frame 10 and the seat cushion frame 70 according to various exemplary embodiments of the present invention.

Referring to FIG. 5 and FIG. 6 together with FIG. 1, the seatback frame 10 includes a main frame 10b and a sub-frame 10a. The first sliding bracket 20 is coupled to a middle portion of the sub-frame 10a. The top end portions of seatback hinge brackets 11 pivotally coupled to the seat cushion frame 70 are fixed to both portions of the bottom end portion of the sub-frame 10a, directed toward the bottom portion. Here, mounting holes 12 may be provided in the bottom end portions of the seatback hinge brackets 11, respectively.

Furthermore, the main frame 10b is provided in front of the sub-frame 10a. The main frame 10b is configured such that the bottom portions thereof are fitted to the mounting holes 12 formed in the bottom end portion of the seatback hinge brackets 11.

Furthermore, cushion hinge brackets 71 are fixed to rear end portions of the seat cushion frame 70, respectively. The rear end portions of the cushion hinge brackets 71 are axially coupled to side surfaces of the bottom end portions of the seatback hinge brackets 11 via the hinge structures 72, respectively.

That is, since the seat cushion frame 70 is coupled to the seatback frame 10 by coupling the cushion hinge brackets 71 to side surfaces of the seatback hinge brackets 11, by which the sub-frame 10a and the main frame 10b are coupled, via the hinge structures 72, the installation structure of the brackets coupling the seatback frame 10 and the seat cushion frame 70 is optimized. Accordingly, the coupling structure between the components may be simplified, and material costs and the weight of a product may be reduced.

Furthermore, referring to FIG. 1, seatback fixing portions 13 may integrally extend upwards from top end portions of the sub-frame 10a to which the first sliding bracket 20 is coupled.

Furthermore, V-shaped coupling holes 14 may be provided in top end portions of the seatback fixing portions 13 such that the seatback may be coupled to the seatback fixing portions 13 via the coupling holes 14.

For example, the hinge shaft 30 is provided to couple the front end portion of the first sliding bracket 20 to the middle portion of the sub-frame 10a. The seatback fixing portions 13 extend in the longitudinal direction thereof, as portions located above the portions to which the hinge shaft 30 is coupled.

Furthermore, the coupling holes 14 are provided on the top portion top end portions of the seatback fixing portions 13 such that wire frames 15 fixed to a pad of the seatback may be fitted into the coupling holes 14.

That is, the seatback pad is coupled to the top portion top end portion of the seatback by welding fixing brackets provided as separate pieces. Thus, the fixing brackets are required as additional components, and a welding operation for fixing the fixing brackets is required. Accordingly, there are problems that fabrication costs for a product and the weight of the product are increased with increases in the number of components and the number of process steps is increased.

In this regard, in various exemplary embodiments of the present invention, the seatback is mounted by coupling the wire frames 15 of the seatback pad to the top end portions of the seatback fixing portions 13 integrally extending from the top portion top end portion of the sub-frame 10a. Thus, it may be possible to reduce the number of components necessary for the attachment of the seatback, reducing fabrication costs for and the weight of a product. Accordingly, the problem resulting from the structure in which the fixing bracket is welded may be overcome.

Furthermore, an operation of adjusting the angle of the seatback 2 using the reclining device of the present invention will be described. When it is directed to lay the seatback 2 to a relax position from the upright position of the seatback 2 as illustrated in FIG. 1, the motor 60 is rotated forward in a response to the operation of the reclining operation switch.

Accordingly, the rear end portion of the first sliding bracket 20 is rotated upwards with respect to the front end portion of the first sliding bracket 20, so that the guide roller 21 coupled to the rear end portion of the first sliding bracket 20 is moved upwards along the slot 41 formed in the second sliding bracket 40.

Consequently, as illustrated in FIG. 2, the top portion top end portion of the seatback frame 10 is rotated in a direction in which the top portion top end portion thereof is reclined about the hinge structures 72 on the bottom end portion of the seatback frame 10, so that the angle of the seatback 2 may be adjusted so that the seatback 2 is in the relax position. Here, only the angle of the seatback 2 is adjusted, with the position of the seat cushion being fixed.

Furthermore, when it is directed to return the angle of the seatback 2 from the position in FIG. 2 to the position in FIG. 1, the motor 60 is rotated reversely in a response to the reclining operation switch being operated.

Accordingly, the rear end portion of the first sliding bracket 20 is rotated downwards with respect to the front end portion of the first sliding bracket 20, so that the guide roller 21 is moved downwards again along the slot 41.

Consequently, as illustrated in FIG. 1, the seatback frame 10 is rotated in a direction in which the top portion top end portion of the seatback frame 10 is upright forwards with respect to the hinge structures 72 on the bottom end portion, so that the angle of the seatback 2 may be adjusted to the upright position. In the instant case, only the angle of the seatback 2 is adjusted, with the position of the seat cushion being fixed.

According to various exemplary embodiments of the present invention as described above, in the case of a rear seat of a car, only the angle of the seatback 2 may be adjusted, with the position of the seat cushion being fixed, to increase the space of the leg room in front of the rear seat passenger in the seat relax mode, improving the comfort of the rear seat passenger.

Furthermore, the degree by which the angle of the seatback 2 is adjusted may be increased to increase the degree of freedom of the relaxing position of the passenger, and the supporting ability of the bottom portion of the seatback may be increased to improve the comfort of the passenger.

Furthermore, the first sliding bracket 20 and the hinge shaft 30 may be integrated, and the second sliding bracket 40 and the mounting bracket 50 may be integrated, so that the number of components may be reduced to reduce costs for materials and the weight of the product. Furthermore, the seat cushion frame 70 is coupled to the seatback frame 10 by coupling the cushion hinge brackets 71 to the side surfaces of the seatback hinge brackets 11, by which the sub-frame 10a and the main frame 10b are coupled, using the hinge structures 72. Accordingly, the installation structure of the brackets, by which the seatback frame 10 and the seat cushion frame 70 are coupled, may be optimized, simplifying the coupling structure between components and reducing costs for materials and the weight of the product.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:
1. A seat reclining apparatus comprising:
a seatback frame forming a skeleton of a seatback, and coupled to a seat cushion frame to be rotatable about the seat cushion frame;
a first sliding bracket, wherein the first sliding bracket includes a first end portion rotatably coupled to a middle portion of the seatback frame by a driving unit, and a second end portion extending toward a vehicle body located behind the seatback;
a second sliding bracket mounted on the vehicle body located behind the seatback and extending toward the first sliding bracket to be slidably connected to the second end portion of the first sliding bracket, wherein the second sliding bracket is configured to guide a sliding movement of the first sliding bracket while the first sliding bracket is rotated, wherein the seatback frame includes:
- a sub-frame to which the first end portion of the first sliding bracket is pivotally coupled, with a seatback hinge bracket being fixed to a bottom end portion of the sub-frame; and
- a main frame provided in a front of the sub-frame, wherein a bottom portion of the main frame is mounted to a bottom end portion of the seatback hinge bracket,
- wherein a cushion hinge bracket fixed to a rear end portion of the seat cushion frame is pivotally coupled to the seatback hinge bracket.

2. The seat reclining apparatus of claim 1,
wherein a guide roller is coupled to the second end portion of the first sliding bracket, and
wherein a slot is provided in a longitudinal direction of the second sliding bracket along the second sliding bracket so that the guide roller slidably engaged to the slot of the second sliding bracket slides along the slot.

3. The seat reclining apparatus of claim 1, wherein a hinge shaft is fixed to the first end portion of the first sliding bracket, and is rotatably coupled to the middle portion of the seatback frame.

4. The seat reclining apparatus of claim 3,
wherein the driving unit is a motor, and
wherein the motor and the hinge shaft are coupled so that the first sliding bracket is rotated by a rotational force of the motor.

5. The seat reclining apparatus of claim 4,
wherein a driving gear is coupled to a shaft of the motor,
wherein a driven gear is fixed to an end portion of the hinge shaft and gear-engaged with the driving gear,
wherein a stopping hole is provided in the driven gear along a path of a rotation of the driven gear, and
wherein a stopper pin is inserted into the stopping hole to control a rotation angle of the driven gear.

6. The seat reclining apparatus of claim 5, further including a support bracket, wherein a first end portion of the support bracket is connected to the seatback frame and a second end portion of the support bracket is connected to the stopper pin.

7. The seat reclining apparatus of claim 5, wherein the driving gear is a pinion gear, and the driven gear is a sector gear.

8. The seat reclining apparatus of claim 1, wherein a mounting bracket is fixed to a rear end portion of the second sliding bracket, and is mounted on the vehicle body.

9. The seat reclining apparatus of claim 1, wherein a seatback fixing portion integrally extends upwards from a top end portion of the sub-frame to which the first sliding bracket is pivotally coupled.

10. The seat reclining apparatus of claim 9, wherein a V-shaped coupling hole is provided in a top end portion of the seatback fixing portion so that the seatback is coupled to the seatback fixing portion through the V-shaped coupling hole.

* * * * *